United States Patent
Lin et al.

(10) Patent No.: US 11,502,928 B2
(45) Date of Patent: Nov. 15, 2022

(54) FUZZ TESTING APPARATUS AND FUZZ TESTING METHOD

(71) Applicant: Institute For Information Industry, Taipei (TW)

(72) Inventors: Pei-Yi Lin, Taipei (TW); Chih-Wei Chen, Taipei (TW); Chia-Wei Tien, Taipei (TW); Chin-Wei Tien, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 225 days.

(21) Appl. No.: 17/115,539

(22) Filed: Dec. 8, 2020

(65) Prior Publication Data

US 2022/0166699 A1 May 26, 2022

(30) Foreign Application Priority Data

Nov. 20, 2020 (TW) ................................ 109140697

(51) Int. Cl.
*H04L 43/10* (2022.01)
*H04L 43/04* (2022.01)
*G06N 3/08* (2006.01)

(52) U.S. Cl.
CPC ............... *H04L 43/10* (2013.01); *G06N 3/08* (2013.01); *H04L 43/04* (2013.01)

(58) Field of Classification Search
None
See application file for complete search history.

(56) References Cited

U.S. PATENT DOCUMENTS

| 2009/0310491 | A1* | 12/2009 | Ginsberg | H04L 43/50 370/241 |
| 2015/0319072 | A1* | 11/2015 | Chakrabarti | H04L 43/50 370/250 |
| 2016/0350211 | A1* | 12/2016 | Cecchetti | G06F 11/3696 |
| 2018/0365139 | A1* | 12/2018 | Rajpal | G06F 21/577 |
| 2020/0028905 | A1* | 1/2020 | Chinitz | H04L 43/10 |

OTHER PUBLICATIONS

Wen et al. "Protocol vulnerability detection based on network traffic analysis and binary reverse engineering", PLoS One 12(10): e0186188, Oct. 19, 2017 [retrieved on Sep. 9, 2022]. Retrieved from the Internet: <URL: https://doi.org/10.1371/journal.pone.0186188> (Year: 2017).*

European Search Report, Application No. 20212921.9, EP4002768, dated May 28, 2021 [retrieved on Sep. 10, 2022]. (Year: 2021).*

* cited by examiner

*Primary Examiner* — Kevin T Bates
*Assistant Examiner* — Dae Kim
(74) *Attorney, Agent, or Firm* — CKC & Partners Co., LLC (57) ABSTRACT

A fuzz testing apparatus transmits a plurality of packets to the device under test (DUT), and calculates a probability of abnormal state, a normal response time and an abnormal-state-processing time of the DUT for the packets. Then, the fuzz testing apparatus estimates a maximum quantity of packets that can be sent to the DUT according to the probability of abnormal state the normal response time and the abnormal-state-processing time corresponding to the standby time of the DUT. Finally, the fuzz testing apparatus determines a plurality of test packets from a plurality of candidate test packets according to the maximum quantity of packets.

10 Claims, 5 Drawing Sheets

|      | S1 | S2 |    | S3 |    | S4 |   |   |   |   |   |
|------|----|----|----|----|----|----|---|---|---|---|---|
| NP1 →| 10 | 10 | 10 | 1  | 10 | 3  | 3 | 0 | 5 | 0 | 1 |
| NP2 →| 10 | 0  | ae | 0  | 0  | 5  | 2 | 6 | 5 | 1 | 4 |
| NP3 →| 10 | 0  | 4c | 5  | 70 | 0  | 0 | 9 | 0 | 3 | 7 |

FIG. 2B

|    | S1 | S2 |    | S3 |    | S4 |   |   |   |   |   |   |
|----|----|----|----|----|----|----|---|---|---|---|---|---|
| CTP01 | 00 | 05 | 02 | 00 | c4 | 0 | 0 | 1 | 6 | 0 | 1 |
| CTP02 | 25 | 05 | 05 | 43 | 2  | 4 | 0 | 1 | 0 | 2 | 2 |
| CTP03 | 13 | 05 | 08 | 17 | 70 | 5 | 0 | 8 | 7 | 6 | 3 |

⇒

|    | S1 | S2 |    | S3 |    | S4 |   |   |   |   |   |   |
|----|----|----|----|----|----|----|---|---|---|---|---|---|
| CTP1 | 00 | 05 | 02 | 28 | FF | 0 | 0 | 1 | 6 | 0 | 1 |
| CTP2 | 25 | 05 | 05 | 43 | 2  | 4 | 0 | 1 | 0 | 8 | 9 |
| CTP3 | 13 | 05 | 08 | 17 | 70 | 5 | 0 | 8 | 7 | 8 | 9 |

FUZZ TESTING APPARATUS AND FUZZ TESTING METHOD

PRIORITY

This application claims priority to Taiwan Patent Application No. 109140697 filed on Nov. 20, 2020, which is hereby incorporated by reference in its entirety.

FIELD

The present disclosure relates to a fuzz testing apparatus and a fuzz testing method. More specifically, the present disclosure relates to a fuzz testing apparatus and a fuzz testing method for determining a complete batch of test packets by estimating the maximum quantity of packets that can be transmitted.

BACKGROUND

Multiple product lines may be deployed in a manufacture environment, and in order to ensure the information security of the manufacture environment, it is necessary to perform fuzz tests on devices on each product line in the environment to find out the weaknesses in the environment and improve them. Since the purpose of fuzz testing is to cause an abnormal state of a device under test (hereinafter referred to as "DUT"), it is usually performed when the product line is in a dormant mode. In practice, each round of fuzz tests corresponds to a batch of complete test data (which can be composed of test packets). However, since the time of dormant mode of the product line is limited (e.g., 48 hours), traditional fuzz testing methods may sometimes fail to complete all tests in time, resulting in incomplete test results, or even the incapability of generating reports based on the test results. Furthermore, because there might be an overall consideration when designing a batch of test data (e.g., designing 500 specific test packets to test a specific function of the DUT), the traditional method being unable to complete the test in time means that a part of the entire batch of test data will be discarded, and the consequence is not only a reduction in the total number of times the DUT being tested, but also the complete omission of tests for specific functions (which may be critical functions for the DUT).

In view of this, there is an urgent need in the field of a fuzz testing apparatus and a fuzz testing method that do not sacrifice the integrity of the test in the limited test time.

SUMMARY

To solve at least the aforesaid problems, provided is a fuzz testing apparatus. The fuzz testing apparatus may comprise a storage, a transceiver and a processor. The storage may be electrically connected with the transceiver and the processor, and the processor may be electrically connected with the transceiver. The storage may be configured to store a plurality of candidate test packets. The transceiver may be configured to transmit a plurality of packets to a DUT. The processor may be configured to calculate an abnormal-state probability, a normal response time and an abnormal-state-processing time of the DUT for the packets, and estimate a maximum quantity of packets that can be sent to the DUT in a time period of the DUT according to the abnormal-state probability, the normal response time and the abnormal-state-processing time. Then, the processor may further be configured to determine a plurality of test packets from the candidate test packets according to the maximum quantity of packets. Finally, the transceiver may be further configured to transmit the test packets to the DUT, so as to perform a fuzz test to the DUT.

To solve at least the aforesaid problems, also provided is a fuzz testing method. The fuzz testing method may be executed by an electronic computing apparatus, and the electronic computing apparatus may store a plurality of candidate test packets. The fuzz testing method may comprise the following steps:

transmitting a plurality of packets to a DUT;

calculating an abnormal-state probability, a normal response time and an abnormal-state-processing time of the DUT for the packets;

estimating a maximum quantity of packets that can be sent to the DUT in a time period of the DUT according to the abnormal-state probability, the normal response time and the abnormal-state-processing time;

determining a plurality of test packets from the candidate test packets according to the maximum quantity of packets; and transmitting the test packets to the DUT, so as to perform a fuzz test to the DUT.

Based on the above, the fuzz testing method of the present disclosure estimates the maximum quantity of packets sent by the DUT during a period of time, such as a dormant period, and determines the test packets to be used for testing accordingly, thereby designing test data that can completely test the important functions of the DUT within the time period. Therefore, the fuzz testing method of the present disclosure solves the problem that the traditional method cannot perform a complete fuzz test in time during the dormant period.

What have described above is not intended to limit the present invention, but merely outlines the solvable technical problems, the usable technical means, and the achievable technical effects for a person having ordinary skill in the art to preliminarily understand the present disclosure. According to the attached drawings and the following detailed description, a person having ordinary skill in the art can further understand the details of various embodiments of the present disclosure.

BRIEF DESCRIPTION OF THE DRAWINGS

The drawings are provided for describing various embodiments, in which.

DETAILED DESCRIPTION

In the following description, the present invention will be described with reference to certain example embodiments thereof. However, these example embodiments are not intended to limit the invention to any particular operations, environment, applications, structures, processes, or steps described in these example embodiments. For ease of description, contents unrelated to the embodiments of the present disclosure or contents that shall be appreciated without particular description are omitted from depiction; and dimensions of elements and proportional relationships among individual elements in the attached drawings are only exemplary examples but not intended to limit the scope of the claimed invention. Unless stated particularly, same (or similar) reference numerals may correspond to same (or similar) elements in the following description. Unless otherwise specified, the quantity of each element described below may be one or more.

Terms used in this disclosure are only used to describe the embodiments, and are not intended to limit the scope of the claimed invention. Unless the context clearly indicates otherwise, singular forms "a" and "an" are intended to comprise the plural forms as well. Terms such as "comprising" and "including" indicate the presence of stated features, integers, steps, operations, elements and/or components, but do not exclude the presence of one or more other features, integers, steps, operations, elements, components and/or combinations thereof. The term "and/or" comprises any and all combinations of one or more associated listed items.

Figure 1:
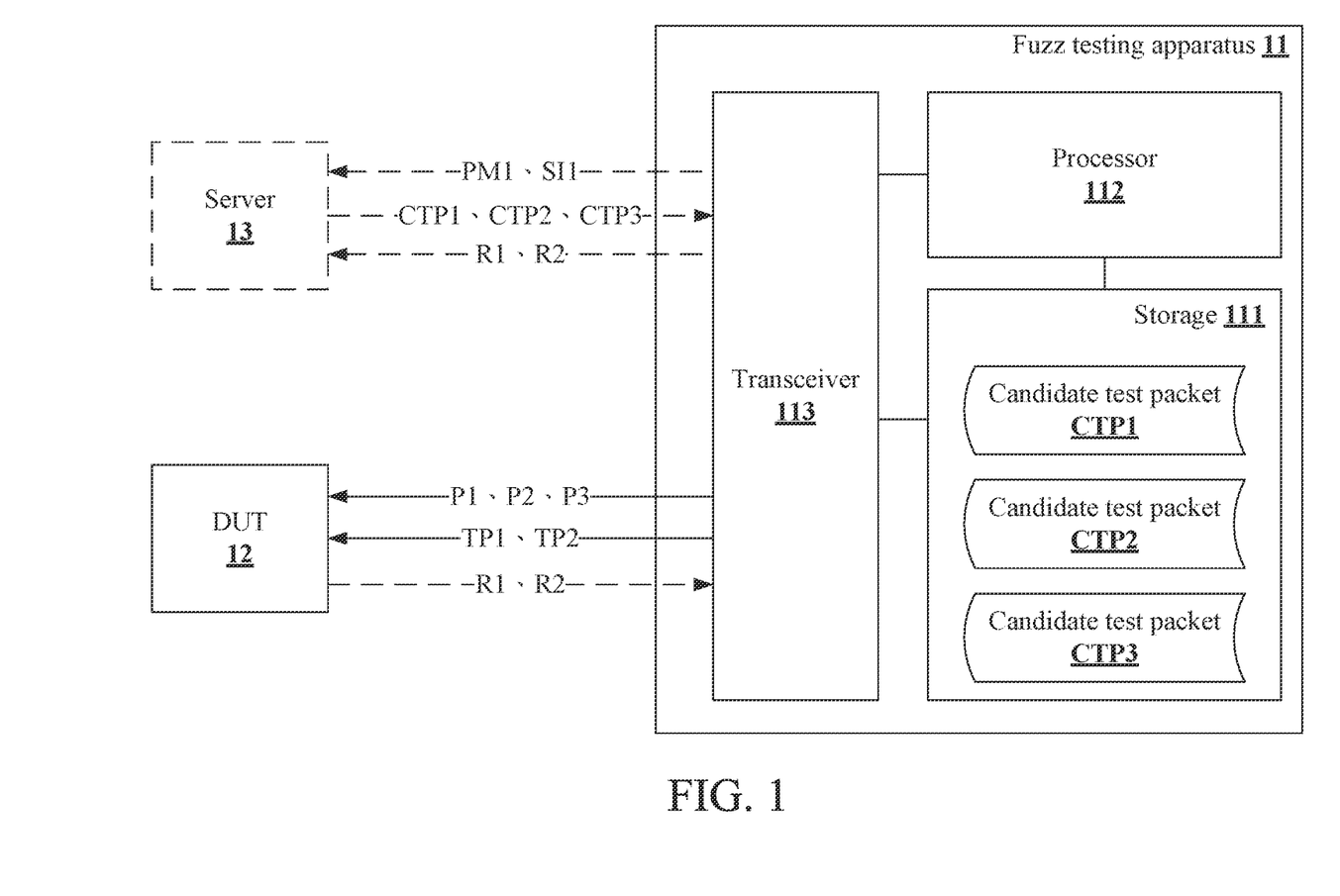
FIG. 1 illustrates a fuzz testing apparatus according to one or more embodiments of the present disclosure.

FIG. 1 illustrates a fuzz testing apparatus according to one or more embodiments of the present disclosure. However, the contents shown in FIG. 1 are only for illustrating embodiments of the present disclosure, but not for limiting the scope of the claimed invention.

Referring to FIG. 1, a fuzz testing apparatus 11 may basically comprise a storage 111, a processor 112 and a transceiver 113. The storage 111 may be electrically connected with the processor 112 and the transceiver 113. The electrical connections among the storage 111, the processor 112 and the transceiver 113 may be direct connection (i.e., connected not via other elements) or indirect connection (i.e., connected via other elements). The fuzz testing apparatus 11 may be various types of computing apparatuses, such as desktop computers, portable computers, mobile phones, portable electronic accessories (glasses, watch, etc.) or the like. The fuzz testing apparatus 11 may be deployed in a manufacture environment (for example but not limited to: a smart manufacturing factory), so as to test the computers that control various manufacture devices (for example but not limited to: machines on a product line) in the manufacture environment. The related details will be described later.

The storage 111 may be configured to store data generated by the fuzz testing apparatus 11, data transmitted from an external device, or data input by the user. The storage 111 may comprise a first-level memory (which is also referred to as a main memory or an internal memory), and the processor 112 may directly read the instruction set stored in the first-level memory, and execute these instruction sets when needed. The storage 111 may optionally comprise a second-level memory (which is also referred to as an external memory or a secondary memory), and the second-level memory may transmit the stored data to the first-level memory through a data buffer. For example, the second-level memory may be, but is not limited to: a hard disk, an optical disk, etc. The storage 111 may optionally comprise a third-level memory, that is, a storage device that can be directly inserted into or removed from the computer, such as a mobile disk. The storage 111 may store a plurality of candidate test packets CTP1, CTP2, CTP3.

The processor 112 may be any of various microprocessors or microcontrollers capable of signal processing. The microprocessor or the microcontroller is a special programmable integrated circuit that has the functions of operation, storage, output/input, or the like, and may accept and process various coded instructions, thereby performing various logical operations and arithmetical operations, and outputting the corresponding operation results. The processor 112 may be programmed to interpret various instructions to process the data in the fuzz testing apparatus 11 and execute various operational programs or applications.

The transceiver 113 may be used for wired or wireless communication with devices outside, and may comprise a transmitter and a receiver. Taking wireless communication as an example, the transceiver 113 may comprise, but is not limited to, an antenna, an amplifier, a modulator, a demodulator, a detector, an analog-to-digital converter, a digital-to-analog converter or other communication elements. Taking wired communication as an example, the transceiver 113 may be, for example but not limited to, a gigabit Ethernet transceiver, a gigabit Ethernet interface converter (GBIC), a small form-factor pluggable (SFP) transceiver, a ten gigabit small form-factor pluggable (XFP) transceiver, or the like. The transceiver 113 may transmit a plurality of test packets TP1 and TP2 to a DUT 12, thereby performing fuzz tests.

Figure 2A:
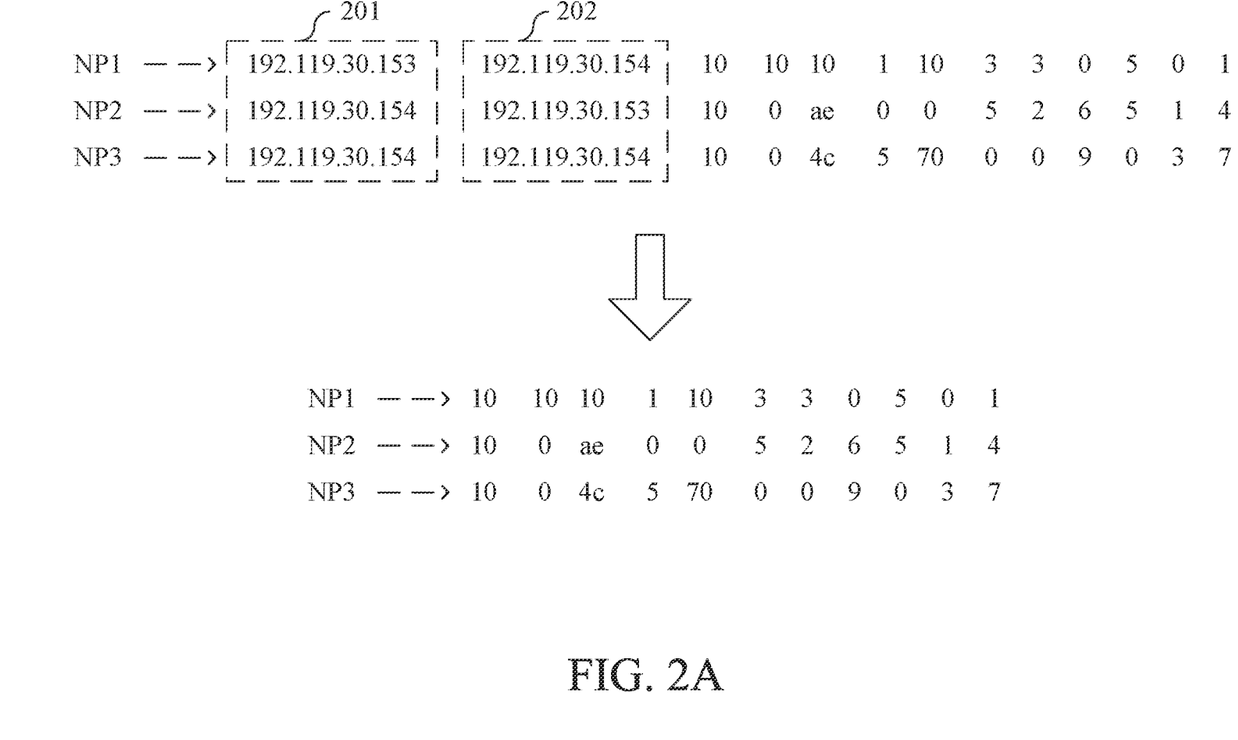
FIG. 2A illustrates a way for removing sensitive information according to one or more embodiments of the present disclosure.
Figure 2B:
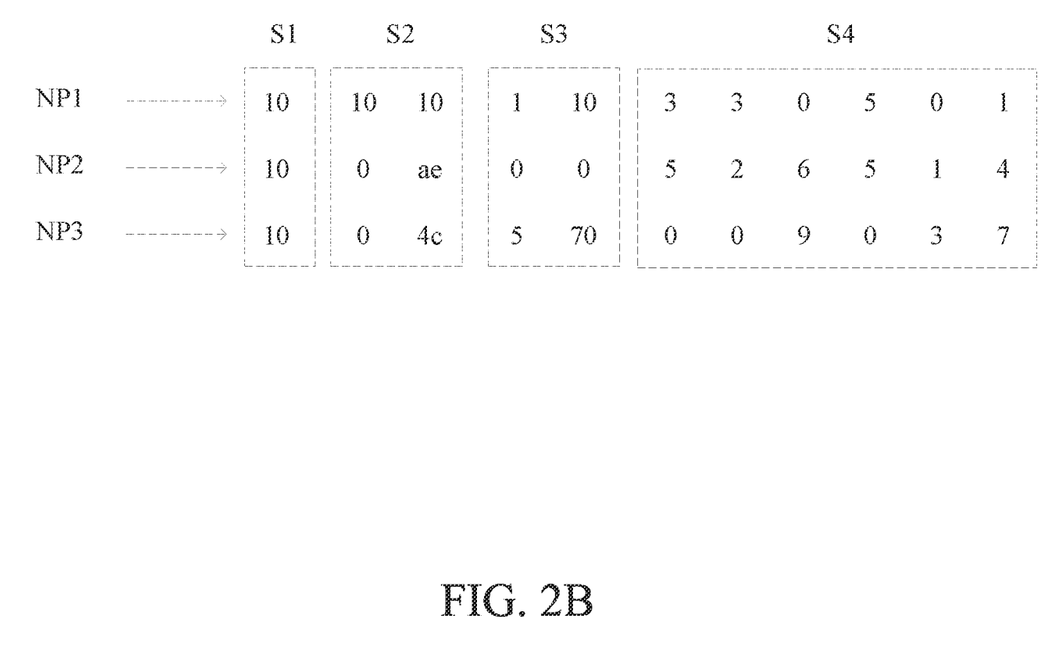
FIG. 2B illustrates data sections according to one or more embodiments of the present disclosure.
Figure 2C:
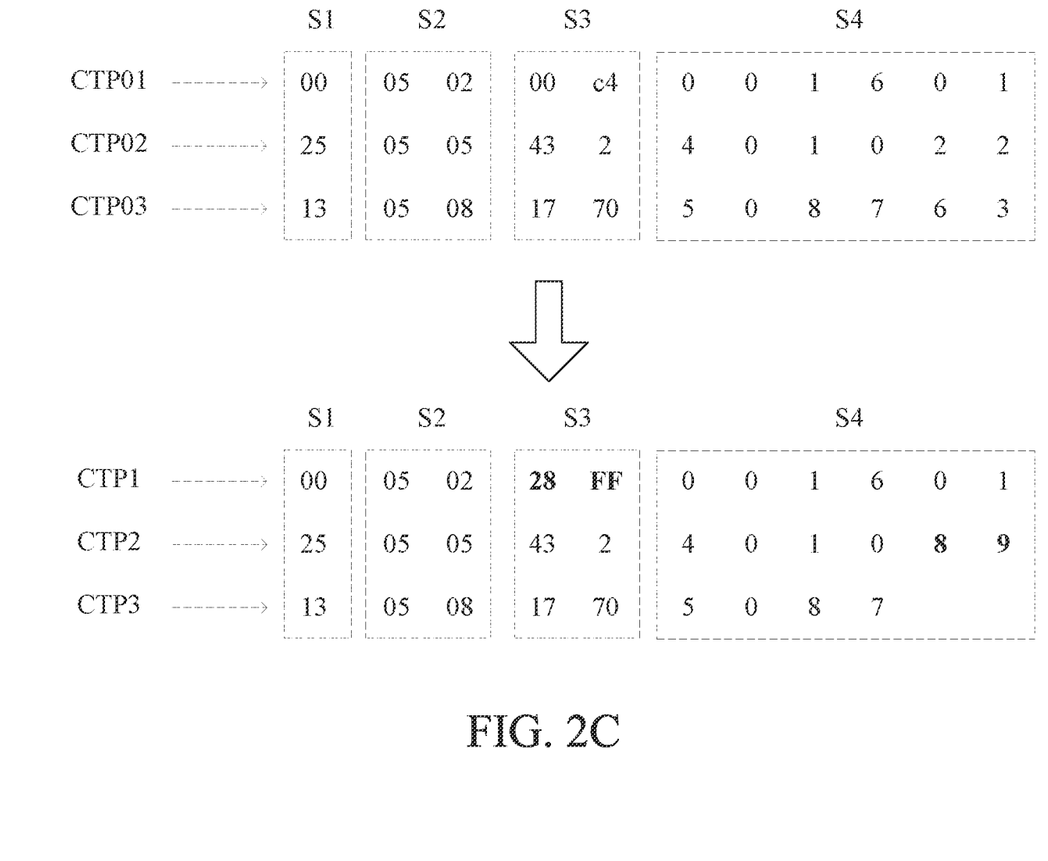
FIG. 2C illustrates ways of mutation according to one or more embodiments of the present disclosure.

FIG. 2A illustrates a way for removing sensitive information according to one or more embodiments of the present disclosure. FIG. 2B illustrates data sections according to one or more embodiments of the present disclosure. FIG. 2C illustrates ways of mutation according to one or more embodiments of the present disclosure. However, the contents shown in FIG. 2A, FIG. 2B and FIG. 2C are only for illustrating embodiments of the present disclosure, but not for limiting the scope of the claimed invention.

The main process of the fuzz testing apparatus 11 performing a fuzz test to the DUT 12 will be described as follows. Referring to FIG. 1, FIG. 2A, FIG. 2B and FIG. 2C simultaneously, first, in some embodiments, the processor 112 may work together with the transceiver 113 to capture a plurality of normal packets NP1, NP2, and NP3 sent and received by the DUT 12, and the storage 111 may further be configured to store the normal packets NP1, NP2, and NP3 that conform to a communication protocol format adopted by the DUT 12 (not shown in the drawings) Since the normal packets NP1, NP2, and NP3 conform to the format of the communication protocol adopted by the DUT 12 (e.g., Transmission Control Protocol (TCP), Modbus, or the like), the processor 112 may analyze the normal packets NP1, NP2, and NP3 to learn the format information therein, and then generate other packets with similar formats. Specifically, the processor 112 may use the normal packets to train a neural network (e.g., Long Short-Term Memory (LSTM) network, Recurrent Neural Network (RNN), Deep Neural Network (DNN), or the like) to build a prediction model PM1. The prediction model PM1 may generate a packet whose format is similar to the normal packet according to the normal packet input.

However, in view of the fact that not all information in each normal packet is necessary for the prediction model PM1 to generate the packet, and the normal packet may contain information related to the DUT 12 or other devices communicating with the DUT 12 (e.g., other manufacture devices on the same product line). Therefore, before training the neural network to build the predictive model PM1, the processor 112 may remove at least one piece of sensitive information in the normal packets NP1, NP2, and NP3 to avoid the possibility of the created prediction model PM1 involving sensitive information.

In some embodiments, the types of the above-mentioned sensitive information may comprise, for example but not limited to, media access control (MAC) address, internet protocol (IP) address, network port address, device name, geographical location information, international mobile equipment identity (IMEI), international mobile subscriber identity (IMSI), payload, transmission time, etc. For example, as shown in FIG. 2A, the processor 112 may remove the sensitive information 201 and 202, which belong to the network protocol location, in the normal packets NP1, NP2, and NP3. Subsequently, the processor 112 may train the neural network according to the normal packets NP1, NP2, and NP3 from which the at least one piece of sensitive information has been removed, so as to establish a prediction model PM1.

In some embodiments, the transceiver 113 may transmit the prediction model PM1 to a server 13. The server 13 may merge at least one other prediction model provided by other devices (e.g., the computer controlling the manufacture device in another product line) into the prediction model PM1, and generate candidate test packets CTP1, CTP2 and CTP3 with the merged prediction model PM1. In this way, the candidate test packets CTP1, CTP2 and CTP3 generated by the predictive model PM1 may have the characteristics of the packets used by multiple devices (e.g., conforming to the communication protocol format adopted by those devices), such that the candidate test packets CTP1, CTP2 and CTP3 may be used for testing the DUT 12. Therefore, the transceiver 113 may receive the candidate test packets CTP1, CTP2 and CTP3 from the server 13.

In some embodiments, as shown in FIG. 2B, after capturing the normal packets NP1, NP2, and NP3, the processor 112 may determine a plurality of data sections S1, S2, S3 and S4 (such as but not limited to: header, main content, identification code, or the like) in the normal packets NP1, NP2, and NP3 to generate a piece of data-section information SI1, and the transceiver 113 may transmit the data-section information SI1 along with the prediction model PM1 to the server 13, so that the server 13 may have knowledge about the data section of the packet used by the DUT 12 while generating packets with the prediction model PM1. In this case, after the prediction model PM1 generates the packet, the server 13 may further mutate the generated packet, and use the mutated packet as the candidate test packets CTP1, CTP2, and CTP3. To be more specific, the server 13 may record a plurality of weight values corresponding to a plurality of mutation forms, and may randomly use one of the mutation forms to mutate the packets generated by the prediction model PM1 according to the weight values, and then use the mutated packets as the candidate test packets CTP1, CTP2, and CTP3.

Therefore, the candidate test packets CTP1, CTP2, and CTP3 may record corresponding mutation forms (i.e., the mutation form which the candidate test packet has undergone), and each candidate test packet may correspond to at least one mutation form. A mutation form may refer to mutating one of the data sections in the packet in one of a plurality of mutation way (e.g., character mutation, length mutation, bit mutation, or the like). For example, as shown in FIG. 2C, after the prediction model PM1 generates a plurality of packets CTP01, CTP02, and CTP03, the server 13 may perform character mutation for the data section S3 of the packet CTP01, and may perform character mutation for the data section S4 of the packet CTP02, and may also perform length mutation for the data section S4 of packet CTP03.

Before the formal fuzz test process is performed on the DUT 12, the processor 112 may reset the network domain used by the DUT 12 from a first network domain to a second network domain through the transceiver 113 when the DUT 12 is in the dormant mode (i.e., there is no production work related to the product line where the DUT 12 is located). The first network domain may correspond to a first product line where the DUT 12 is located, and the first network domain may also comprise a second product line where other devices are located. The second network domain may be, for example, an isolated network domain. In this way, any action performed on the DUT 12 may be prevented from affecting other product lines.

Then, the processor 112 may transmit, via the transceiver 113, a plurality of packets P1, P2, and P3 to the DUT 12, so as to evaluate how to perform a fuzz test through the response of the DUT 12. Specifically, the processor 112 may calculate at least one of, or all of, an abnormal-state probability, a normal response time, and an abnormal-state-processing time of the DUT 12 for the packets. The abnormal state probability may be the probability of the abnormal state (e.g., the device showing no response) of the DUT 12 corresponding to the input packets P1, P2, and P3. The normal response time may be the time it takes for the DUT 12 to respond to the input packet in a normal state. The abnormal-state-processing time may be the time required to process the abnormal state (e.g., re-establish a connection with the device) of the DUT 12 and restore it to the normal state when the DUT 12 has turned into the abnormal state corresponding to the input packet.

It should be noted that the description of the quantity of packets in this disclosure is only an example and not a limitation. A person having ordinary skill in the art should understand that the quantity of such packets is not limited to three. In some embodiments, the packets P1, P2, and P3 may be generated by the processor 112 with the prediction model PM1 after the prediction model PM1 is established. In some embodiments, the packets P1, P2, and P3 may be determined by the processor 112 from a plurality of candidate test packets stored in the storage 111.

Subsequently, the processor 112 may estimate a maximum quantity of packets that the transceiver 113 can send to the DUT 12 in a time period corresponding to the DUT 12 according to at least one of, or all of, the abnormal-state probability, the normal response time, and the abnormal-state-processing time. The time period can be, for example, a dormant period. After that, the processor 112 determines a plurality of test packets from the candidate test packets in the storage 111 according to the maximum quantity of packets. For example, suppose that the abnormal-state probability of the DUT 12 corresponding to three input packets P1, P2, P3 calculated by the processor 112 is "66%", the normal response time is "0.0006 second per packet", and the abnormal-state-processing time is "3 seconds per packet". When the dormant period of the DUT 12 is "48 hours", the processor 112 may estimate that the maximum quantity of packets that the transceiver 113 can send to the DUT 12 during the dormant period is "86,391".

After estimating the maximum quantity of packets, the processor 112 may determine a plurality of test packets TP1 and TP2 from the plurality of candidate test packets stored in the storage 111 according to the maximum quantity of packets. To be more specific, the processor 112 may determine the quantity of packets that can be allocated for testing each function of the DUT 12 within the maximum quantity of packets. It should be noted that the description of the quantity of packets in this disclosure is only an example and not a limitation. A person having ordinary skill in the art should understand that the quantity of test packets is not limited to two.

After determining the test packets TP1 and TP2 for testing the DUT 12, the processor 112 may transmit, via the transceiver 113, the test packets TP1 and TP2 to the DUT 12 when the next dormant period of the DUT 12 starts, so as to perform a fuzz test. In some embodiments, the transceiver 113 may receive a plurality of test results R1 and R2 of the DUT 12 for the test packets TP1 and TP2. Each test result may include at least the operating state (e.g., in a normal state or a specific abnormal state) of the DUT 12 corresponding to one of the test packets TP1 and TP2 and the mutation form corresponding to the test packet (e.g., one of the mutation forms corresponding to the candidate test packets mentioned above). Then, the transceiver 113 may transmit the test results R1 and R2 to the server 13 so that the server 13 may adjust the weight value of the mutation form used to generate the candidate test packet according to the test results R1 and R2. To be more specific, when the test results R1 and R2 exhibit that a specific mutation type is likely to cause important abnormal states in the DUT 12, returning the test results R1 and R2 may allow the server 13 to increase the weight value of the specific mutation form that caused the important abnormal state accordingly, and reduce the weight value of other mutation forms accordingly, so as to increase the probability of adopting the specific mutation form when generating candidate test packets next time. It should be noted that whether the abnormal state is important depends on the needs of the user. For example, the user may define "device shutting down automatically", "device showing no response" and other abnormal states that require a force restart of the device to be eliminated as important, or may also define abnormal states that require specific commands to be eliminated as important.

Based on the above, the fuzz testing process performed by the fuzz testing apparatus 11 of the present disclosure for the DUT 12 estimates, in advance, the maximum quantity of packets feasible in a limited time, and plan the multiple test packets required for an all-rounded test for the DUT 12 accordingly, so as to complete a fuzz test within a limited time. In addition, the fuzz testing process performed by the fuzz testing apparatus 11 of the present disclosure for the DUT 12 also removes unnecessary sensitive information of the product line at the local end to avoid uploading it to the server 13 and causing the leakage of sensitive information. Furthermore, the fuzz testing process performed by the fuzz testing apparatus 11 of the present disclosure for the DUT 12 also feeds the test result back to the server 13 afterwards, so as to improve the way of generating test packets of the next fuzz test.

Figure 3:
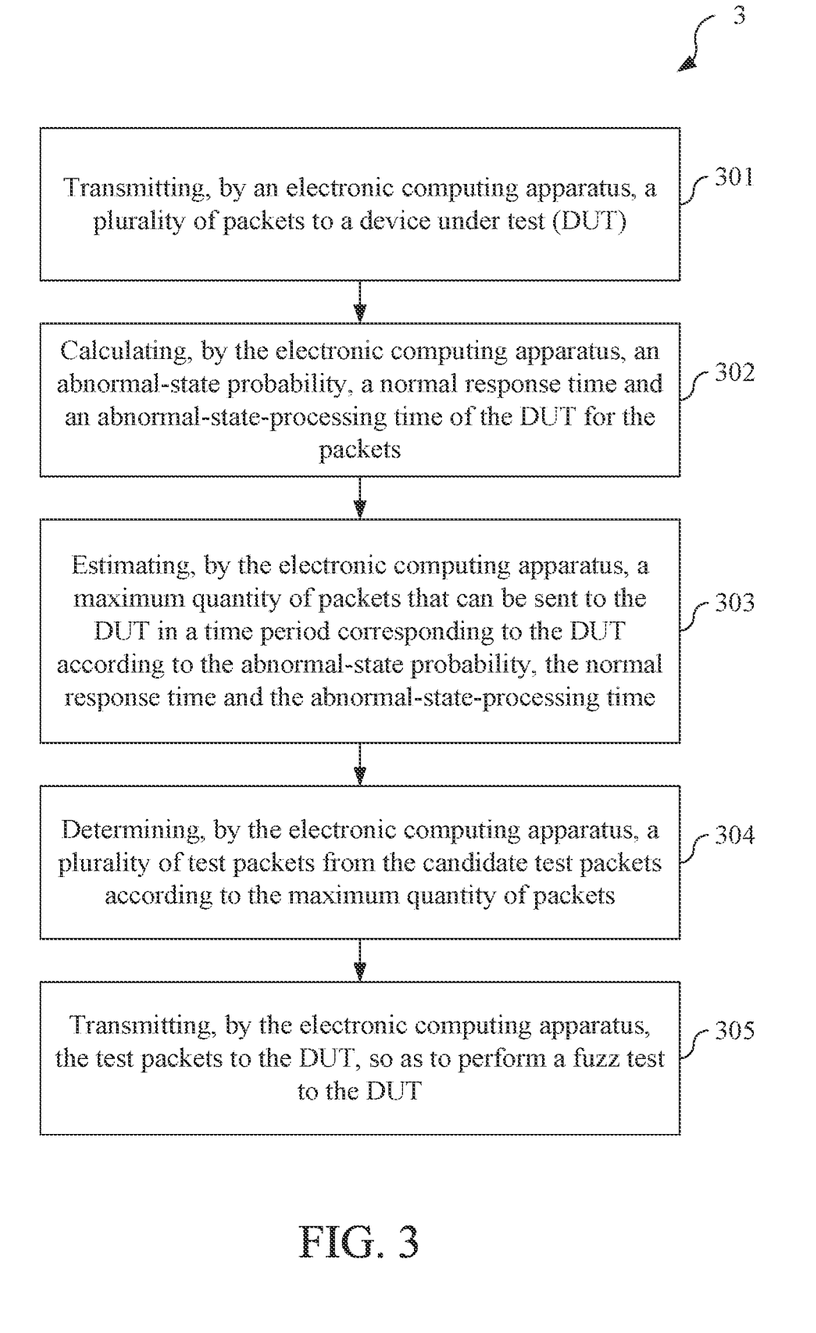
FIG. 3 illustrates a fuzz testing method according to one or more embodiments of the present disclosure.

FIG. 3 illustrates the fuzz testing method according to one or more embodiments of the present disclosure. However, the contents shown in FIG. 3 are only for illustrating embodiments of the present disclosure, but not for limiting the scope of the claimed invention.

Referring to FIG. 3, a fuzz testing method 3 may be performed by an electronic computing apparatus, and the electronic computing apparatus may store a plurality of pieces of candidate test packets. The fuzz testing method 3 may comprise the following steps:

transmitting a plurality of packets to a DUT (labeled as 301);

calculating an abnormal-state probability, a normal response time and an abnormal-state-processing time of the DUT for the packets (labeled as 302);

estimating a maximum quantity of packets that can be sent to the DUT in a time period corresponding to the DUT according to the abnormal-state probability, the normal response time and the abnormal-state-processing time (labeled as 303);

determining a plurality of test packets from the candidate test packets according to the maximum quantity of packets (labeled as 304); and transmitting the test packets to the DUT, so as to perform a fuzz test to the DUT (labeled as 305).

In some embodiments, the fuzz testing method 3 may further comprise:

resetting, before transmitting the packets, a network domain adopted by the DUT from a first network domain to a second network domain, the first network domain being different from the second network domain.

In some embodiments, regarding the fuzz testing method 3, the electronic computing apparatus may further store a plurality of normal packets conforming to a protocol format adopted by the DUT. Also, the fuzz testing method 3 may further comprise the following steps:

removing at least one piece of sensitive information from each of the normal packets, wherein categories of the at least one piece of sensitive information at least comprise a media access control address, an internet protocol address, a network port address, a payload, and a transmission time;

training a neural network according to the normal packets whose sensitive information has been removed, so as to establish a prediction model;

transmitting the prediction model to a server, such that the server generates the candidate test packets with the prediction model; and receiving the candidate test packets from the server.

In some embodiments, regarding the fuzz testing method 3, the electronic computing apparatus may further store a plurality of normal packets conforming to a protocol format adopted by the DUT. Also, the fuzz testing method 3 may further comprise the following steps:

removing at least one piece of sensitive information from each of the normal packets, wherein categories of the at least one piece of sensitive information at least comprise a media access control address, an internet protocol address, a network port address, a payload, and a transmission time;

training a neural network according to the normal packets whose sensitive information has been removed, so as to establish a prediction model;

determining a plurality of data sections of the normal packets, so as to generate a piece of data-section information;

transmitting the prediction model and the piece of data-section information to a server, such that the server mutates packets generated by the prediction model according to the piece of data-section information, so as to generate the candidate test packets, wherein the candidate test packets record a plurality of mutation forms corresponding to the candidate test packets; and receiving the candidate test packets from the server. Moreover, in some embodiments, other than the abovementioned steps, the fuzz testing method 3 may further comprise the following steps:

receiving a plurality of test results of the DUT regarding the test packets, each of the test results at least comprising an operating status of the DUT corresponding to one of the test packets and the mutation form corresponding to the test result; and transmitting the test results to the server, so that the server adjusts a plurality of weight values of the mutation forms for generating the candidate test packets according to the test results.

Each embodiment of the fuzz testing method 3 basically corresponds to a certain embodiment of the fuzz testing apparatus 11. Therefore, even though not all of the embodiments of the fuzz testing method 3 are described in detail above, those embodiments of the fuzz testing method 3 that are not thoroughly described shall be fully understood by a person having ordinary skill in the art simply by referring to the above description for the fuzz testing device 11.

The above disclosure is related to the detailed technical contents and inventive features thereof for some embodiments of the present invention, but such disclosure is not to limit the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A fuzz testing apparatus, comprising:
   a storage, being configured to store a plurality of candidate test packets;
   a transceiver, being electrically connected with the storage and configured to transmit a plurality of packets to a device under test (DUT); and
   a processor, being electrically connected with the storage and the transceiver and configured to:
      calculate an abnormal-state probability, a normal response time and an abnormal-state-processing time of the DUT for the packets;
      estimate a maximum quantity of packets being sent to the DUT in a time period corresponding to the DUT according to the abnormal-state probability, the normal response time and the abnormal-state-processing time; and
      determine a plurality of test packets from the candidate test packets according to the maximum quantity of packets;
   wherein the transceiver is further configured to transmit the test packets to the DUT, so as to perform a fuzz test to the DUT.

2. The fuzz testing apparatus of claim 1, wherein the processor is further configured to reset, before the transceiver transmitting the packets, a network domain adopted by the DUT from a first network domain to a second network domain via the transceiver, the first network domain being different from the second network domain.

3. The fuzz testing apparatus of claim 1, wherein the storage is further configured to store a plurality of normal packets conforming to a protocol format adopted by the DUT, and the processor is further configured to:
   remove at least one piece of sensitive information from each of the normal packets, wherein categories of the at least one piece of sensitive information at least comprise a media access control address, an internet protocol address, a network port address, a payload, and a transmission time; and
   train a neural network according to the normal packets whose sensitive information has been removed, so as to establish a prediction model;
   wherein the transceiver is further configured to:
      transmit the prediction model to a server, such that the server generates the candidate test packets with the prediction model; and
      receive the candidate test packets from the server.

4. The fuzz testing apparatus of claim 1, wherein the storage is further configured to store a plurality of normal packets conforming to a protocol format adopted by the DUT, and the processor is further configured to:
   remove at least one piece of sensitive information from each of the normal packets, wherein categories of the at least one piece of sensitive information at least comprise a media access control address, an internet protocol address, a network port address, a payload, and a transmission time;
   train a neural network according to the normal packets whose sensitive information has been removed, so as to establish a prediction model; and
   determine a plurality of data sections of the normal packets, so as to generate a piece of data-section information; and
   wherein the transceiver is further configured to:
      transmit the prediction model and the piece of data-section information to a server, such that the server mutates packets generated by the prediction model according to the piece of data-section information, so as to generate the candidate test packets, wherein the candidate test packets record a plurality of mutation forms corresponding to the candidate test packets; and
      receive the candidate test packets from the server.

5. The fuzz testing apparatus of claim 4, wherein the transceiver is further configured to:
   receive a plurality of test results of the DUT regarding the test packets, each of the test results at least comprising an operating status of the DUT corresponding to one of the test packets and the mutation form corresponding to the test result; and
   transmit the test results to the server, so that the server adjusts a plurality of weight values of the mutation forms for generating the candidate test packets according to the test results.

6. A fuzz testing method, being executed by an electronic computing apparatus, the electronic computing apparatus storing a plurality of candidate test packets, the fuzz testing method comprising:
   transmitting a plurality of packets to a device under test (DUT);
   calculating an abnormal-state probability, a normal response time and an abnormal-state-processing time of the DUT for the packets;
   estimating a maximum quantity of packets being sent to the DUT in a time period corresponding to the DUT according to the abnormal-state probability, the normal response time and the abnormal-state-processing time;
   determining a plurality of test packets from the candidate test packets according to the maximum quantity of packets; and
   transmitting the test packets to the DUT, so as to perform a fuzz test to the DUT.

7. The fuzz testing method of claim 6, further comprising:
   resetting, before transmitting the packets, a network domain adopted by the DUT from a first network domain to a second network domain, the first network domain being different from the second network domain.

8. The fuzz testing method of claim 6, wherein the electronic computing apparatus further stores a plurality of normal packets conforming to a protocol format adopted by the DUT, and the fuzz testing method further comprises:
   removing at least one piece of sensitive information from each of the normal packets, wherein categories of the at least one piece of sensitive information at least comprise a media access control address, an internet protocol address, a network port address, a payload, and a transmission time;

training a neural network according to the normal packets whose sensitive information has been removed, so as to establish a prediction model;

transmitting the prediction model to a server, such that the server generates the candidate test packets with the prediction model; and receiving the candidate test packets from the server.

9. The fuzz testing method of claim 6, wherein the electronic computing apparatus further stores a plurality of normal packets conforming to a protocol format adopted by the DUT, and the fuzz testing method further comprises:

removing at least one piece of sensitive information from each of the normal packets, wherein categories of the at least one piece of sensitive information at least comprise a media access control address, an internet protocol address, a network port address, a payload, and a transmission time;

training a neural network according to the normal packets whose sensitive information has been removed, so as to establish a prediction model;

determining a plurality of data sections of the normal packets, so as to generate a piece of data-section information;

transmitting the prediction model and the piece of data-section information to a server, such that the server mutates packets generated by the prediction model according to the piece of data-section information, so as to generate the candidate test packets, wherein the candidate test packets record a plurality of mutation forms corresponding to the candidate test packets; and receiving the candidate test packets from the server.

10. The fuzz testing method of claim 9, further comprising:

receiving a plurality of test results of the DUT regarding the test packets, each of the test results at least comprising an operating status of the DUT corresponding to one of the test packets and the mutation form corresponding to the test result; and transmitting the test results to the server, so that the server adjusts a plurality of weight values of the mutation forms for generating the candidate test packets according to the test results.

\* \* \* \* \*